(12) United States Patent
Wu et al.

(10) Patent No.: US 12,732,959 B2
(45) Date of Patent: Sep. 8, 2026

(54) PAGING FOR NETWORK-BASED USER EQUIPMENT (UE)-TO-UE COMMUNICATION

(71) Applicant: QUALCOMM Incorporated, San Diego, CA (US)

(72) Inventors: Shuanshuan Wu, San Diego, CA (US); Hong Cheng, Basking Ridge, NJ (US); Anantharaman Balasubramanian, San Diego, CA (US); Qing Li, Princeton Junction, NJ (US)

(73) Assignee: Qualcomm Incorporated, San Diego, CA (US)

( * ) Notice: Subject to any disclaimer, the term of this patent is extended or adjusted under 35 U.S.C. 154(b) by 238 days.

(21) Appl. No.: 18/463,098

(22) Filed: Sep. 7, 2023

(65) Prior Publication Data

US 2025/0089019 A1 Mar. 13, 2025

(51) Int. Cl.
*H04W 68/02* (2009.01)
*H04W 4/40* (2018.01)

(52) U.S. Cl.
CPC ............. *H04W 68/02* (2013.01); *H04W 4/40* (2018.02)

(58) Field of Classification Search
None
See application file for complete search history.

(56) References Cited

U.S. PATENT DOCUMENTS

2009/0017797 A1* 1/2009 Li ......................... H04W 72/02 455/500
2022/0377702 A1 11/2022 Chun
2023/0026316 A1* 1/2023 Chen ..................... H04W 68/00

OTHER PUBLICATIONS

International Search Report and Written Opinion—PCT/US2024/036348—ISA/EPO—Oct. 14, 2024.

* cited by examiner

*Primary Examiner* — Frantz Bataille
(74) *Attorney, Agent, or Firm* — Norton Rose Fulbright US LLP

(57) ABSTRACT

This disclosure provides systems, methods, and devices for wireless communication that support paging for network-based user equipment (UE)-to-UE communication. In a first aspect, a method of wireless communication performed at a network entity includes identifying a UE-to-UE paging request condition originating at a source UE. The method also includes identifying one or more other network entities within a paging area relative to a location of the source UE. The method further includes transmitting, to the one or more other network entities, one or more paging messages in accordance with the UE-to-UE paging request condition. Other aspects and features are also claimed and described.

30 Claims, 8 Drawing Sheets

500
Application Server 530
Management Server(s) 520
501
510
512
514
516
502
504
506
508
115
540
541
540, 541
542
542, 544
544
546
548
590
592

500
Application Server 530
552
Management Server(s) 520
501
510
512
514
516
502
504
506
508
115
541
560
562
564
566
568
570
572
574
576
590
592

Controller
240
Memory
242
UE-to-UE Paging Information 702
Paging Area Information 703
Communication Logic 704
Wireless Radios
701a-t
Network Entity 700
234a-t

PAGING FOR NETWORK-BASED USER EQUIPMENT (UE)-TO-UE COMMUNICATION

TECHNICAL FIELD

Aspects of the present disclosure relate generally to wireless communication systems, and more particularly, to paging for network-based user equipment (UE)-to-UE communication. Some features may enable and provide improved communications, including efficient resource utilization for implementing UE-to-UE paging and messaging.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Autonomous and semi-autonomous vehicles are one context for wireless communications that is growing in interest and research. Many vehicles are equipped with onboard units (OBUs) that provide wireless communication capabilities. As one example, an OBU integrated in a vehicle may support wireless communication between the vehicle and a wireless network (e.g., a cellular network) over an uplink and downlink air interface, also referred to as a Uu interface. Such communications can support connected functionality for vehicles, such as receiving driving directions, relaying sensor input, text messaging and voice calling functionality, and the like. Additionally, research has begun into using OBUs to provide direct vehicle-to-vehicle communications over a sidelink interface, also referred to as a PC5 interface. However, such direct vehicle-to-vehicle communications are typically short range and may not be powerful enough to communicate desired information between vehicles or other UEs that are not sufficiently close to an original vehicle (or UE). In such implementations, traditional network-based communications may be used, but such communications may not be designed to serve the particular requirements and context of vehicle-to-UE communications or other UE-to-UE communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed at a network entity. The method includes identifying a user equipment (UE)-to-UE paging request condition originating at a source UE. The method also includes identifying one or more other network entities within a paging area relative to a location of the source UE. The method further includes transmitting, to the one or more other network entities, one or more paging messages in accordance with the UE-to-UE paging request condition.

In an additional aspect of the disclosure, an apparatus for wireless communication at a network entity includes a processing system that includes one or more processors and one or more memories coupled with the one or more processors. The processing system is configured to cause the network entity to identify a UE-to-UE paging request condition originating at a source UE. The processing system is also configured to cause the network entity to identify one or more other network entities within a paging area relative to a location of the source UE. The processing system is further configured to cause the network entity to transmit, to the one or more other network entities, one or more paging messages in accordance with the UE-to-UE paging request condition.

In an additional aspect of the disclosure, an apparatus for wireless communication at a network entity includes means for means for identifying a UE-to-UE paging request condition originating at a source UE. The apparatus also includes means for identifying one or more other network entities within a paging area relative to a location of the source UE. The apparatus further includes means for transmitting, to the one or more other network entities, one or more paging messages in accordance with the UE-to-UE paging request condition.

In an additional aspect of the disclosure, a non-transitory computer-readable medium stores instructions that, when executed by a processor, cause the processor to perform operations for wireless communication at a network entity. The operations include identifying a UE-to-UE paging request condition originating at a source UE. The operations also include identifying one or more other network entities within a paging area relative to a location of the source UE. The operations further include transmitting, to the one or more other network entities, one or more paging messages in accordance with the UE-to-UE paging request condition.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
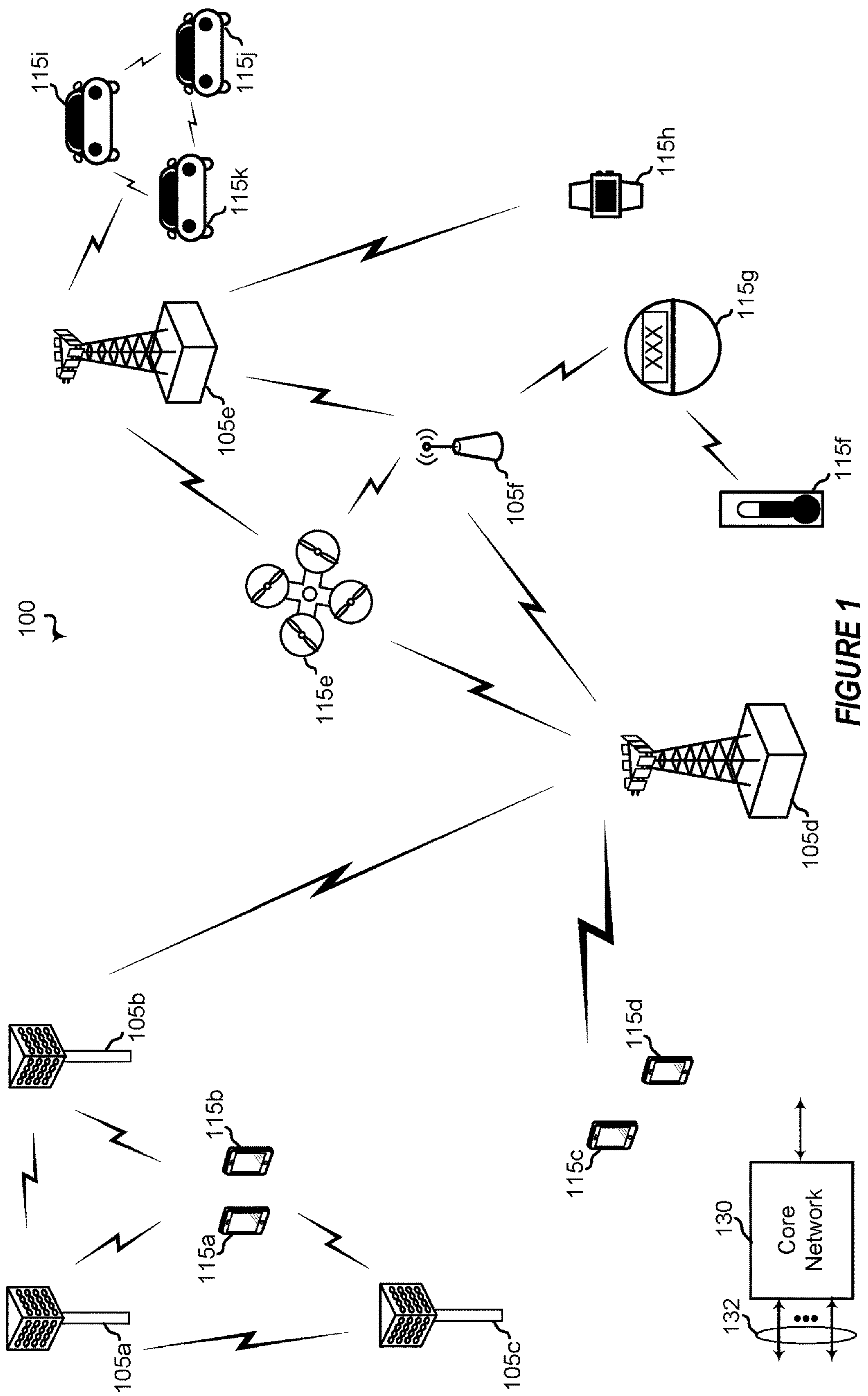
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support paging for network-based user equipment (UE)-to-UE communication. For example, the present disclosure describes techniques that enable a server, or other network entity, that implements access and mobility management function (AMF) functionality to provide network-based or assisted UE-to-UE paging and messaging to proximity-based communication applications at various UEs, such as vehicle-to-everything (V2X) communication applications. To illustrate, a network entity may identify a UE-to-UE paging condition that originates at a source UE, such as by receiving a UE-to-UE paging request from the source UE, receiving a location of the source UE and a paging range, or in other manners described further herein. Responsive to identifying the UE-to-UE paging condition, the network entity may determine a location of the source UE and a paging range associated with the source UE. For example, the network entity may receive location information from the source UE or infer the location of the source UE in accordance with signaling from a base station (or other network entity) that serves the source UE. As another example, the network entity may receive the paging range from the source UE or an application server that supports the proximity-based communication application, or by accessing a profile associated with the source UE. The network entity may determine a paging area in accordance with the location of the source UE and the paging range, such as a circular area centered at the location of the source UE and having a radius equal to the paging range, as a non-limiting example. Upon identifying the paging area, the network entity may identify one or more other network entities (e.g., base stations, roadside units (RSUs), etc.) that serve cells or tracking areas that intersect with the paging area. The network entity may then transmit one or more paging messages to the identified other network entities, for transmitting to other UEs served by the identified other network entities. The paging messages may be addressed to a particular UE, a group of UEs (e.g., that share a group ID), any UE that executes a particular application (e.g., a V2X application), UEs in an application group (e.g., that share a V2X group ID), or the paging messages may be broadcast to all UEs within the serving area of the other network entities. In this manner, the network may assist in supporting proximity-based communications between UEs, particularly UEs that may not support direct UE-to-UE communications over sidelink communications.

Particular implementations of the subject matter described in this disclosure may be implemented to realize one or more of the following potential advantages or benefits. These advantages improve upon proximity-based vehicle UE applications that involve wireless communications with poorly-defined or undefined communications systems with different ranges of operations by providing paging capabilities in vehicle UE applications. The paging capabilities described herein are different than transmission of conventional network-based (e.g., Uu) paging messages. In some aspects, the present disclosure provides techniques for supporting paging for network-based UE-to-UE communication. The techniques described provide a framework for a wireless network, such as a 5th Generation (5G) New Radio (NR) network, to support proximity-based UE-to-UE communications without requiring UEs to be configured for direct UE-to-UE communications over a sidelink. To illustrate, a network entity may be configured to identify UE-to-UE paging conditions and to identify other network entities (e.g., base stations) to receive a paging message for forwarding to UEs within their serving area. This process of identifying network entities and UEs within a paging area and providing paging messages to such devices enables the wireless network to simulate and support UE-to-UE proximity-based communications in addition to conventional network-based communications. For example, UE-to-UE paging may be supported not just between UE pairs or to UE groups, as in network-based paging, but also to UEs that execute a particular application, or an unidentified number of UEs that are located within a particular geographic region (e.g., within a paging range of a source UE). The improved proximity-based UE-to-UE communications disclosed herein are provided in a manner that efficiently uses network resources, particularly by communicating the paging messages to base stations and associated UEs within a particular identified paging area, and not to all base stations and UEs in the network. In some aspects, the disclosed techniques provide V2X paging according to some of these examples that is different from conventional Uu paging by implementing a dedicated P-RNTI that is different from a fixed P-RNTI used to address Uu paging, and the dedicated P-RNTI may be configured or broadcasted by the network. As another example, the paging occasions for proximity-based UE-to-UE paging, such as V2X paging, may be different than Uu paging, e.g., a determination of paging occasions may be in accordance with a V2X related ID (e.g., Layer-2 destination ID, V2X application ID, etc.) rather than a target UE ID as in Uu paging. Shortcomings mentioned here regarding Uu paging are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF), which is an entity in the 5G Core Network (5GC) supporting various functionality, such as managing support for different location services for one or more UEs. For example the LMF may include one or more servers, such as multiple distributed servers. Base stations 105 may forward location messages to the LMF and may communicate with the LMF via a NR Positioning Protocol A (NRPPa). The LMF is configured to control the positioning parameters for UEs 115 and the LMF can provide information to the base stations 105 and UE 115 so that action can be taken at UE 115. In some implementations, UE 115 and base station 105 are configured to communicate with the LMF via an Access and Mobility Management Function (AMF).

Figure 2:
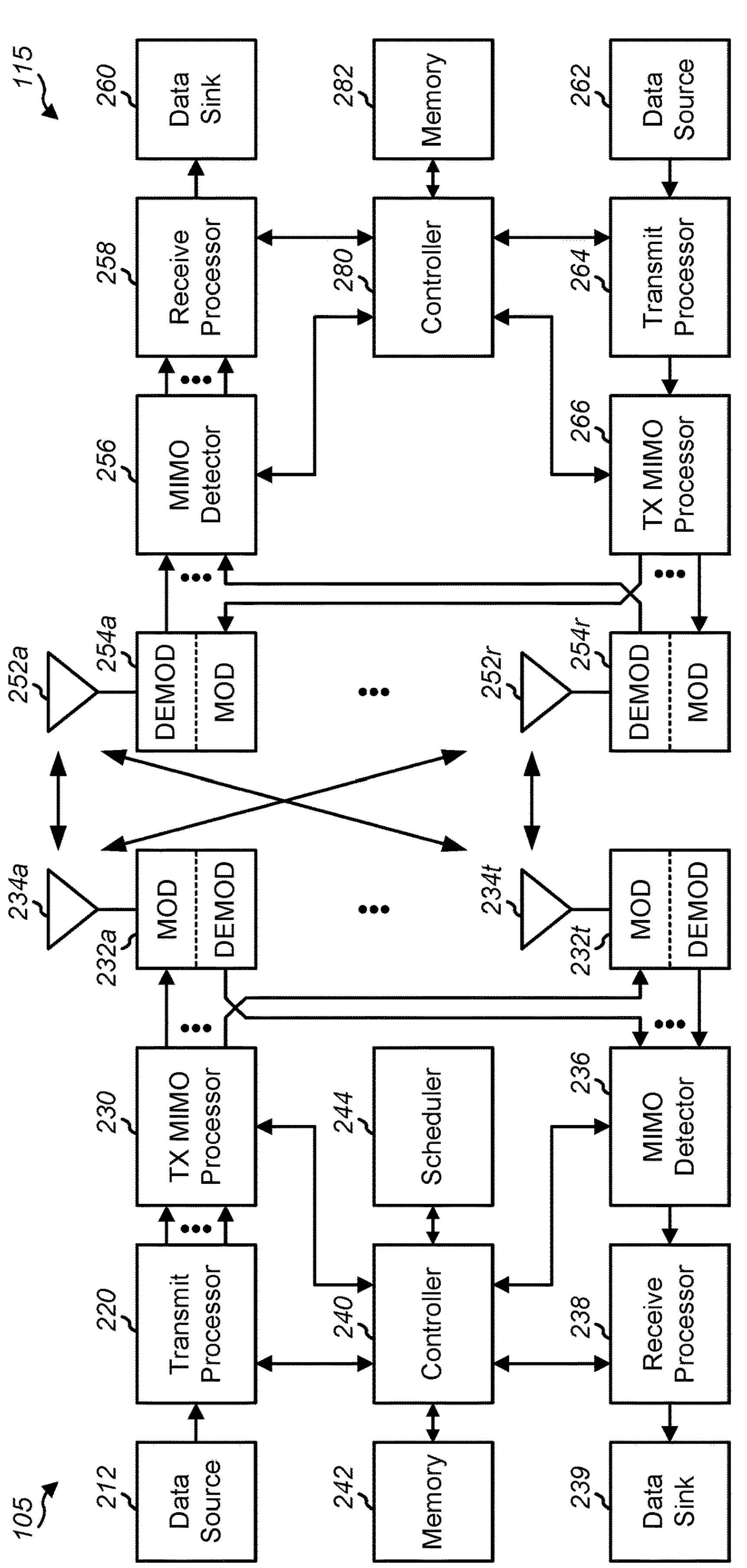
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators **254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240**.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window in accordance with the amount of energy detected on a channel or the acknowledge/negative-acknowledge (ACK/NACK) feedback for its own transmitted packets as a proxy for collisions.

Figure 3:
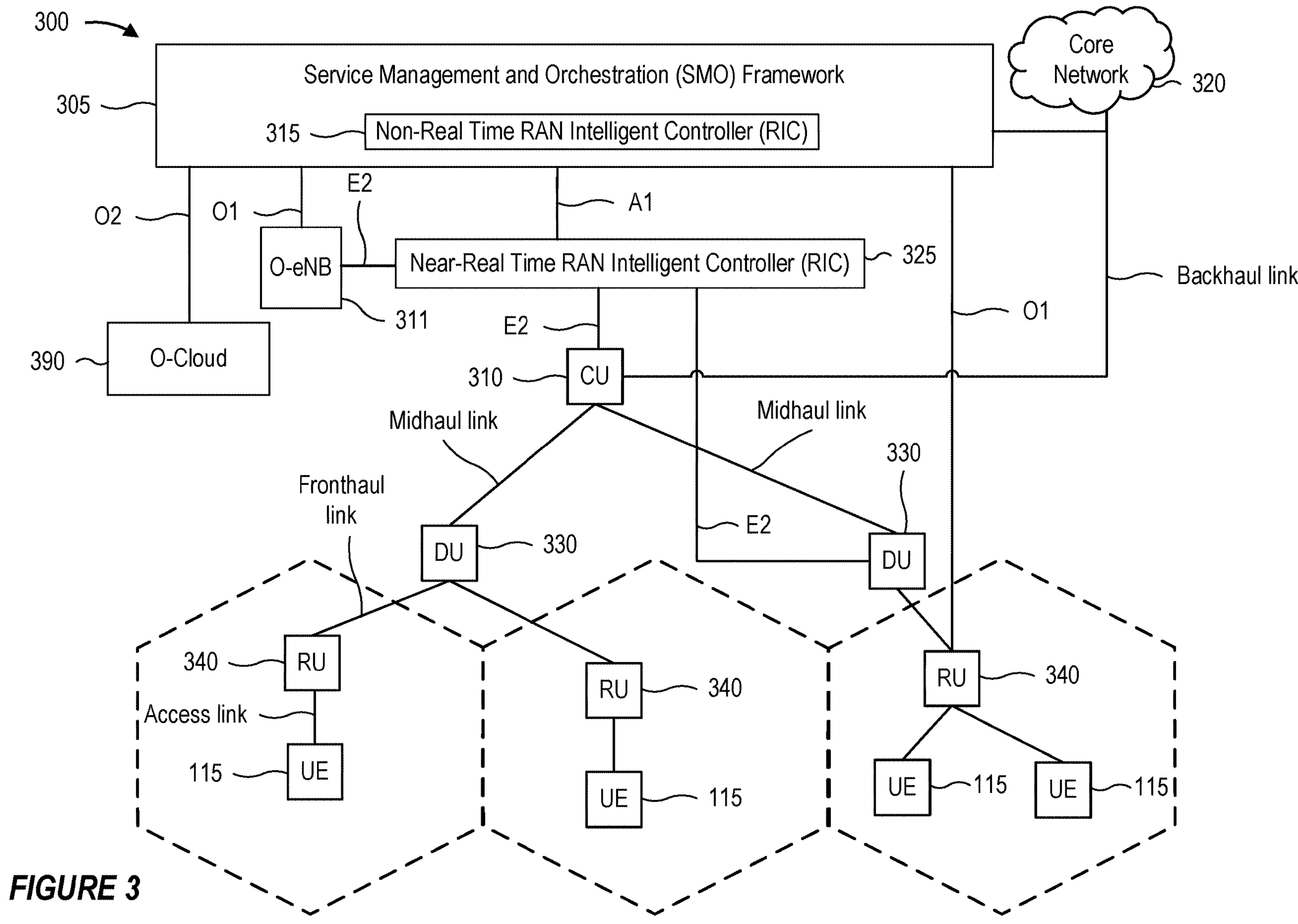
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface.

The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
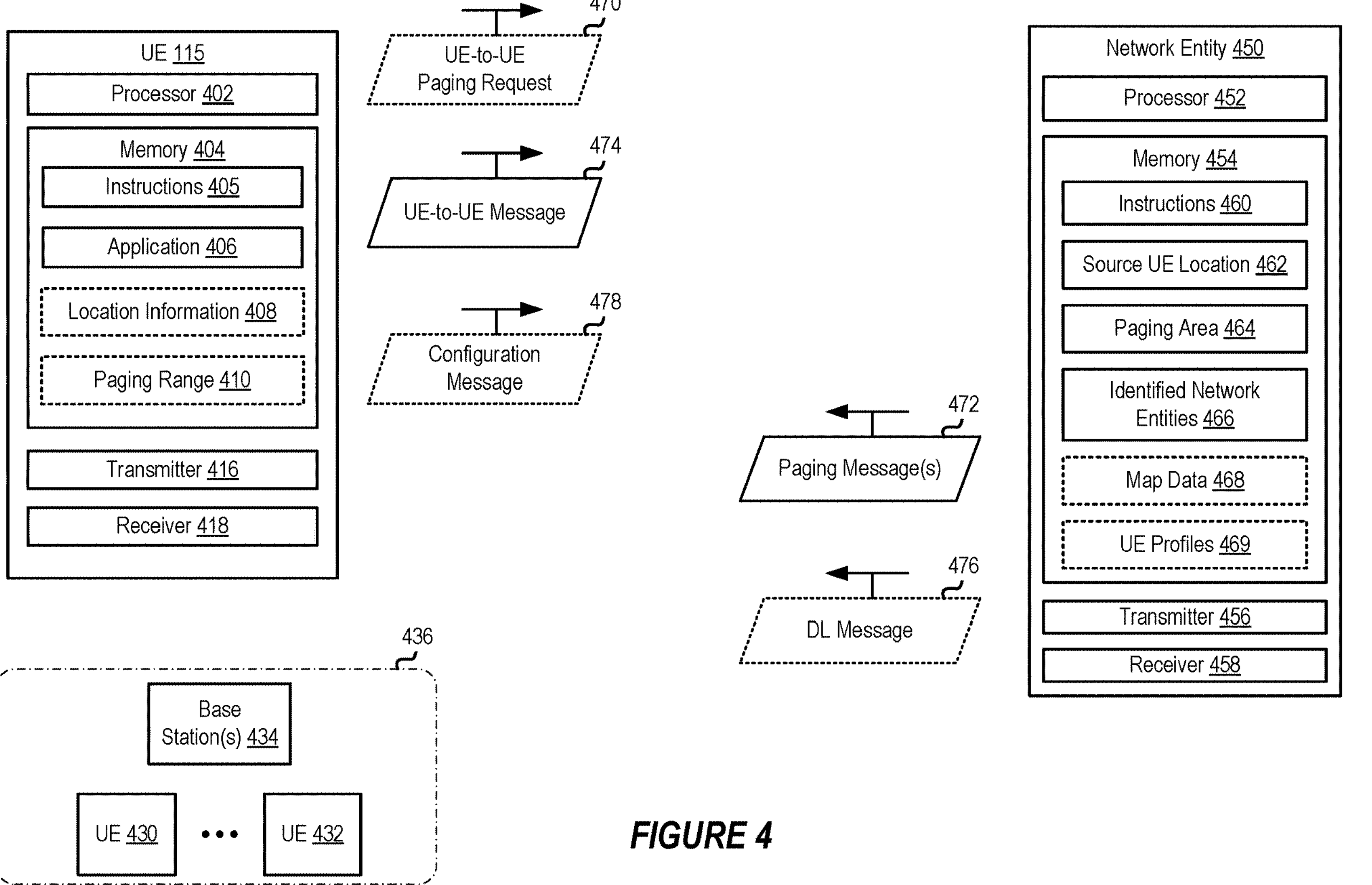
FIG. 4 is a block diagram illustrating an example wireless communication system that supports paging for network-based UE-to-UE communication according to one or more aspects.

FIG. 4 is a block diagram of an example wireless communications system 400 that supports paging for network-based UE-to-UE communication according to one or more aspects. In some examples, wireless communications system 400 may implement aspects of wireless network 100. Wireless communications system 400 includes UE 115, second UE 430, Nth UE 432, one or more base stations 434 (hereinafter referred to collectively as "base stations 434"), and network entity 450. Although three UEs (e.g., UE 115, second UE 430, and Nth UE 432), one base station 434, and one network entity 450 are illustrated, in some other implementations, wireless communications system 400 may generally include fewer than three or more than three UEs, multiple base stations 434, multiple network entities 450, or a combination thereof. In some implementations, UEs 115, 430, and 432 may include vehicles, onboard units (OBUs), wireless phones, tablets, computers, or other devices, any of which may be configured to perform one or more vehicle-to-everything (V2X) communications. Similarly, although referred to as base stations, the functionality of base stations 434 may be performed by one or more roadside units (RSUs), one or more communication nodes, or one or more other types of network entities. Although many examples herein are described in the context of V2X communications, this disclosure is not so limited, and in other implementations, UEs 115, 430, and 432 may include other types of UEs, such as Internet of Things (IoT) devices, that benefit from network-based (e.g., network-assisted) UE-to-UE communications.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, application 406, and optionally location information 408 and paging range 410. Application 406 may include or correspond to an application that performs UE-to-UE paging and messaging, such as a self-driving application or other application that supports V2X communications. The application 406 may operate as a 3GPP-based 5G Access and Mobility Function (AMF), which supports the V2X communications described herein. Additional examples of AMF interactions during the V2X communications are described in further details below. In some other implementations, application 406 may be an IoT application or another type of application that supports UE-to-UE paging and messaging. Location information 408 may indicate a location of UE 115. For example, location information 408 may include or correspond to location coordinates, such as latitude and longitude coordinates, global positioning system (GPS) coordinates, global navigation satellite system (GNSS) coordinates, or another type of what is commonly referred to as "absolute" location or position information. Additionally or alternatively, location information 408 may indicate a relative location of UE 115, such as positioning relative to network entity 450 (which may be a NG-RAN node within the paging area surrounding the UE 115) and/or UEs 430 and 432, which may be determined by UE 115 by performing one or more positioning operations (e.g., in accordance with exchanged signals). Location information 408 is referred to as optional because in some implementations, UE 115 may determine and provide location information 408 to network entity 450, while in some other implementations, other devices such as a base station or an application server may determine and provide location information to network entity 450 on behalf of UE 115. Paging range 410 indicates a paging range (e.g., a distance) from UE 115 to which UE 115 expects to perform UE-to-UE messaging. In a V2X-based example, the paging range 410 may be a few miles, as UE 115 (e.g., a vehicle) may expect to be able to communicate with any other vehicle or UE within a particular-mile radius of UE 115. Paging range 410 is referred to as optional because in some implementations, UE 115 stores and provides paging range 410 to network entity 450, while in some other implementations, other devices such as a base station or an application server may store and provide paging range 410 on behalf of UE 115, or paging range 410 may be stored in a profile associated with UE 115 that is accessible to network entity 450.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, UE 115 may include one or more antenna arrays. The one or more antenna arrays may be coupled to transmitter 416, receiver 418, or a communication interface. The antenna array may include multiple antenna elements configured to perform wireless communications with other devices, such as with base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UEs 430 and 432 may include one or more components as described herein with reference to UE 115. Second UE 430 and Nth UE 432 may be located within a region 436 (e.g., a physical area in which UEs 430 and 432 are located) that corresponds to a paging area, as further described herein. Although two UEs are illustrated in FIG. 4 as being included in region 436, in other implementations, region 436 may include a single UE or more than two UEs (e.g., N may greater or less than three). In some implementations, UEs 115, 430, and 432 are 5G-capable UEs, 6G-capable UEs, or a combination thereof.

Network entity 450 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, network entity 450 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store instructions 460, source UE location 462, paging area 464, identified network entities 466, and optionally map data 468 and UE profiles 469. Source UE location 462 indicates a location of a source UE from which an identified UE-to-UE paging condition originates. Paging area 464 indicates an area to which paging messages are to be sent in accordance with an identified UE-to-UE paging condition, and may correspond to region 436. Paging area 464 may be determined in accordance with source UE location 462 and paging range 410, as further described below. Identified network entities 466 indicate one or more network entities located within paging area 464. Map data 468 includes one or more maps of areas that include locations of UEs that are to receive UE-to-UE paging within paging area 464 (e.g., region 436). The maps may indicate locations of other features, such as roads, geographical features, structures, objects, area divisions (e.g., rooms, properties, towns, cities, states, countries, or the like), network entities within wireless communications system 400, other features, or a combination thereof. UE profiles 469 may include one or more UE profiles that indicate information associated with applications supported at various UEs that support UE-to-UE paging, such as whether UE-to-UE paging is supported, associated paging ranges, other information, or a combination thereof.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, network entity 450 may include one or more antenna arrays. The antenna array may include multiple antenna elements configured to perform wireless communications with other devices, such as with UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Base stations 434 may include one or more components as described herein with reference to network entity 450 or base station 105 of FIGS. 1-3. Base stations 434 may be located within region 436 (e.g., a physical area in which UEs 430 and 432 are located) that corresponds to a paging area, as further described herein. For example, base stations 434 may support one or more cells in which UEs 430 and 432 are located. Although illustrated as a single unit in FIG. 4, base stations 434 may include two or more base stations. In some implementations, base stations 434 are 5G-capable base stations, 6G-capable base stations, or a combination thereof.

In some implementations, wireless communications system 400 implements a 5G NR network. For example, wireless communications system 400 may include multiple 5G-capable UEs 115, 430, and 432 and multiple 5G-capable network entities 450 and base stations 434, such as UEs, base stations, servers, and the like, configured to operate in accordance with a 5G NR network protocol such as that defined by the 3GPP. In some other implementations, wireless communications system 400 implements a 6G network.

During operation of wireless communications system 400, network entity 450 may identify a UE-to-UE paging request condition originating at a source UE, such as UE 115. The UE-to-UE paging condition may indicate that application 406 executed at UE 115 intends to perform proximity-based UE-to-UE measuring, such as by actively requesting paging messaging or by providing the actual UE messaging in addition to the existence of one or more other conditions that indicate paging is requested for the messaging. For example, the UE-to-UE paging request condition may be associated with application 406 executed at UE 115 and similarly executed at UEs 430 and 432. In some implementations, application 406 is related to vehicle performance, such as a navigation application, a self-driving application, a pedestrian safety application, or another type of application, that enables and supports wireless communications to and from vehicles, such as vehicle-to-vehicle (V2V) communications or vehicle-to-everything (V2X) communications. As such, the UE-to-UE paging request condition may be a V2X paging condition or a V2V paging condition. V2X communications may primarily be proximity-based communications. To illustrate, one important use case for V2X is enhanced situational awareness, and as such, only nearby vehicles may be relevant to most V2X communications. Additionally, different V2X communication applications may have different range requirement for communication. As an example, a Cooperative Awareness Message (CAM) may have a range requirement of 300 meters, while a highway traffic jam warning may have a range requirement of 1000 meters. In addition, sidelink-based V2X communications have distance-based reliability (such as a distance-based negative acknowledgement (NACK)) and leverage transmission adaptation (e.g., choice of modulation and coding scheme (MCS), different numbers of repetitions, etc.) to fulfill different range and other service requirements. To support network-based V2X communications, paging may be needed, including paging one or multiple V2X capable UEs, as further described herein, for receiving V2X transmissions in the downlink (DL) or for joining a V2X group or session.

In some aspects, the UE may have specific interactions with the AMF, and those interactions may be supported by Multi-access Edge Computing (MEC) deployments in the network, or generic edge servers. For example, a MEC deployment may communicate requirements or commands to parts of the network, such as the AMF and/or UEs. In some aspects, the MEC deployment may specify a use case scenario and the AMF may translate that use case into specific V2X paging parameters. For example, the MEC deployment or other edge server may receive information, such as a desired range requirement, from the UE, such as a V2X source UE, from with the MEC deployment or other edge server may determine a paging area and control NG-RAN nodes in accordance with the paging area. In another example, the MEC deployment or other edge server may determine the paging area based on known characteristics of the location of a V2X source UE, other UEs, or network conditions. A use case based on those parameters may be determined along with a corresponding paging area, and the NG-RAN nodes controlled in accordance with the paging area. The MEC deployment or edge serves may communicate with the NG-RAN nodes through the AMF, such as through the UPF and SMF. The MEC deployment or edge servers may also or alternatively send paging requests to individual V2X source UEs or other UEs, such as by relaying a paging request through the AMF that specifies source UE ID (e.g., V2X Layer-2 source ID), destination UE ID (e.g., 5G-S-TMSI), V2X Layer-2 destination ID, V2X application ID, and/or V2X group ID. The use cases determined by the MEC deployment or edge servers in these aspects may be based on receiving any of the information available at the source UE or the destination UE in the following examples.

There may be differences between V2X paging and typical network-based paging, such as V2X paging not having a specific destination UE and a paging area for V2X paging being physically limited. As such, the range-based tracking and UE-to-UE paging and messaging described herein may be highly suitable for supporting network-based V2X communications. In other implementations, application 406 may be an IoT application that performs proximity-based UE-to-UE paging and messaging. These examples are not limiting, and in other implementations application 406 may be any type of application that performs proximity-based UE-to-UE communications.

The UE-to-UE paging condition may be actively indicated by UE 115 (e.g., a source UE), passively indicated by UE 115, or enabled by the network (e.g., at network entity 450). In implementations in which the UE-to-UE paging condition is actively indicated, application 406 is configured to cause UE 115 to generate and transmit UE-to-UE paging request 470 to network entity 450. Network entity 450 may identify the UE-to-UE paging condition by receiving UE-to-UE paging request 470 for which UE 115 is the source UE. UE-to-UE paging request 470 may indicate that paging is requested to be performed for an upcoming message from UE 115. For example, UE-to-UE paging request 470 may indicate a destination UE, a destination UE group, a destination application, or a broadcast indicator as the intended target of the paging and the upcoming message. In some implementations, similar to other network-based paging and messaging schemes, UE-to-UE paging request 470 may include a device identifier (ID) or other identification of a destination UE, such as second UE 430, or a group ID that corresponds to a destination group of Ues, such as a group that includes Nth UE 432. In other implementations, UE-to-UE paging request 470 may include an application ID that indicates an application (e.g., application 406) executed by destination Ues, an application group ID that indicates a grouping of UEs within the context of the application. Another still other examples, UE-to-UE paging request 470 may include a broadcast indicator that indicates the upcoming message is to be broadcast to all uEs within a particular range of UE 115. Additionally or alternatively, UE-to-UE paging request 470 may include information used to determine recipients of the paging or messaging, as further described below, location information associated with UE 115 (e.g., the source UE), paging range 410, or both.

In implementations in which the UE-to-UE paging condition is passively indicated, UE 115 may provide information used to determine paging recipients, and providing such information may be identified by network entity 450 as the UE-to-UE paging condition. For example, network entity 450 may receive location information associated with UE 115 (e.g., the source UE), paging range 410, or both, and receipt of either or both of such information may be interpreted by network entity 450 as a request for proximity-based UE-to-UE paging by UE 115. The information may be received directly from UE 115 or from one or more other network entities, such as base stations 434, that serve a cell in which UE 115 is located, or from an application server associated with application 406. In implementations in which the UE-to-UE paging condition is enabled by the network, network entity 450 may identify the paging condition in response to receiving a general paging request or message for transmission to another UE and in accordance with information stored in a profile associated with the UE, such as a profile related to application 406. For example, to determine whether a UE-to-UE paging condition is identified when network entity 450 receives a paging request originating at UE 115, network entity 450 may access UE profiles 469 to determine whether proximity-based UE-to-UE paging and messaging is requested by UE 115 or an application being executed at UE 115. For example, UE profiles 469 may include or correspond to V2X quality of service (QoS) profiles associated with application 406. In some implementations, if UE profiles 469 indicate that UE 115 requests proximity-based UE-to-UE paging and messaging, UE profiles 469 may also indicate paging range 410, such that UE 115 does not need to report paging range 410 to network entity 450.

Responsive to identifying the paging condition, network entity 450 may identify one or more other network entities within a paging area relative to a location of the source UE. For example, network entity 450 may determine source UE location 462 (e.g., a location of UE 115) and paging range 410 (e.g., a maximum range to which UE 115 is configured to send UE-to-UE messages), and network entity 450 may determine paging area 464 in accordance with source UE location 462 and paging range 410. As an example, paging area 464 may be a circle that is centered at the location of UE 115 and that has a radius equal to paging range 410. In other implementations, paging area 464 may have a different shape or may be determined in a different manner, such as a rectangle or half circle to one direction of UE 115, that represents the area to which UE 115 is configured to perform UE-to-UE communications.

In some implementations, UE 115 (e.g., the source UE) may report location information 408, paging range 410, or both, to network entity 450. For example, network entity 450 may receive a reporting message that includes location information 408, and network entity 450 may determine source UE location 462 in accordance with location information 408. In some implementations, the reporting message includes or corresponds to a radio resource control (RRC) message, and the reporting message may be received from UE 115 directly or from a serving base station (or other network entity) associated with UE 115. Alternatively, an application server associated with application 406, such as a V2X application server, may provide a reporting message to network entity 450 that includes location information 408, paging range 410, or both. In some other implementations, location information 408 may be provided in other messaging from UE 115, and network entity 450 may extract location information 408 from such non-reporting messaging. As an example, network entity 450 may receive one or more user data packets that originate at UE 115 and that include location information 408. These user data packets may be addressed for other uEs, such as uEs 430 or 432. Network entity 450 may extract location information 408 from the received user data packets and use the extracted location information to determine source UE location 462. Such extraction of location information 408 may be possible in implementations in which application 406 and network entity 450 are associated with a same entity, such that network entity 450 is capable of decoding and extracting the information, or if the user data packets are not encoded at a higher layer or encrypted in a manner in which network entity 450 cannot decode or decrypt. In such implementations, the user data packets may be forwarded through the network to an application server, and the application server may extract location information 408 and report it to network entity 450, thereby preserving privacy and security of application data.

In some other implementations, network entity 450 may determine or infer the location of UE 115 in accordance with the location of other devices. For example, network entity 450 may determine source UE location 462 in accordance with a location of a base station or other network entity that serves UE 115. One technique for identifying which base station serves UE 115 is for network entity to identify the base station that provides UE-to-UE paging request 470 if such request does not come directly from UE 115. Alternatively, when UE 115 attaches to a cell served by a base station, UE 115 may send a cell attachment message to network entity 450. The cell attachment message may indicate a cell identifier (ID) of a cell that UE 115 is attached to, and network entity 450 may identify a base station associated with the cell in order to determine source UE location 462 in accordance with a location of the identified base station (or the indicated cell). Alternatively, when UE 115 associates with a base station, the base station may send an association message to network entity 450. The association message may indicating the base station that associated with UE 115, such as by including a base station ID and an ID of UE 115. Upon receiving the association message, network entity 450 may determine source UE location 462 in accordance with a location identified base station (or other network entity). Alternatively, network entity 450 may receive one or more user data packets that indicate a UE identifier (ID) of UE 115 and a network entity ID of a serving base station, and network entity 450 may extract the IDs and determine source UE location 462 in accordance with a location of the identified base station. As described above, such extraction may only be possible in implementations in which the user data packets are not encoded at a higher level or encrypted in a manner in which network entity 450 cannot decode or decrypt. In such implementations, the user data packets may be forwarded through the network to the application server, and the application server may extract the IDs and provide them to network entity 450, thereby preserving privacy and security of application data.

Similar to location information 408, paging range 410 may be provided to or otherwise determined by network entity 450 to enable determination of paging area 464. In some implementations as described above, UE-to-UE paging request 470 includes paging range 410. Alternatively, network entity 450 may receive configuration message 478 that originates at UE 115 (e.g., the source UE) and that indicates paging range 410. In some implementations, configuration message 478 may be received from UE 115 (or from another network entity, such as a base station, that forwards configuration message 478 to network entity 450). In some other implementations, configuration message 478 may be received from an application server associated with application 406. In still other implementations, network entity 450 may access UE profiles 469 to determine paging range 410 that is associated with UE 115 in accordance with identifying the UE-to-UE paging condition.

After identifying paging area 464, network entity 450 may identify one or more cells or tracking areas that intersect paging area 464 in order to identify base stations (or other network entities) that are to provide paging signals to uEs within range. For example, map data 468 or other data accessible to network entity 450 may indicate the geographic location of cells or other tracking areas served by base stations within wireless communications system 400, and network entity 450 may identify the base stations (or other network entities) that are associated with cells or other tracking areas that intersect (e.g., overlap) with paging area 464. As a particular example, base stations 434 may serve cells that intersect or overlap with region 436 (e.g., the geographic region represented by paging area 464), and thus identified network entities 466 include base stations 434. Base stations 434 may serve uEs 430 and 432, among others.

In some implementations, identifying paging area 464 may be a multi-step process that includes identifying a possible area as well as identifying paging area 464, and refining paging area 464 to be the overlap or intersection of paging area 464 and the possible area. In some examples, network entity 450 may determine the possible area in accordance with map data 468, UE information associated with UE 115, application information associated with application 406, or a combination thereof. For example and in the context of V2X communications, some types of messages may only be transmitted to uEs that are in front of a moving vehicle (e.g., in the direction the vehicle is traveling), and in such implementations, the possible area may include an area in front of UE 115 but not behind UE 115. As such, the intersection of this possible area (e.g., in front of UE 115) and a circular paging area centered at the location of UE 115 may be an approximate semi-circle centered at UE 115 and that extends forwards and sideways of UE 115. Similarly, some messages may only be transmitted behind a vehicle, and as such, paging area 464 may be refined to remove a portion in front of UE 115. Other examples include location or geographic feature-based areas, such as if only one road is located within an original paging area, reducing the paging area only to cells that cover the road. Other examples are possible, such as in accordance with designated areas in which uEs are not permitted to travel or enter, areas with geographic features that prevent UE travel, or the like. In these examples, identified network entities 466 (e.g., base stations 434) only include network entities that are located in both the initial paging area and a determined "possible area". In some other implementations, instead of network entity 450 identifying a possible area with which to refine paging area 464, an application server associated with application 406 may determine the possible area and provide the possible area to network entity 450. Additional details of operations of such an application server are described below with reference to FIGS. 5B and 5C.

After identifying the identified network entities 466, network entity 450 may transmit, to identified network entities 466, one or more paging messages 472 (referred to hereinafter collectively as "paging messages 472") in accordance with the UE-to-UE paging request condition. In the example shown in FIG. 4 in which identified network entities 466 represent base stations 434 that are located in region 436, network entity 450 sends paging messages 472 to base stations 434 for transmission to uEs 430 and 432 within associated serving cells. Paging messages 472 may include a source UE identifier (ID), a source application ID, or both, to indicate a source of the paging. Additionally or alternatively, paging messages 472 may include a destination UE ID, a destination group ID, or a destination application ID to indicate destination uEs to receive paging messages 472. Alternatively, paging messages 472 are designated as broadcast messages to be broadcasted by base stations 434. In some implementations, paging messages 472 are designated to be transmitted by base stations 434 via paging control channels (PCCHs). In some other implementations, paging messages 472 are designated to be transmitted by base stations 434 as downlink control information (DCI) via physical downlink control channels (PDCCHs). Additionally or alternatively, paging messages 472 may be communicated differently than other network-based, non-UE-to-UE paging. For example, paging messages 472 may include a first paging-radio network temporary identifier (P-RNTI) that is different than a second P-RNTI associated with non-UE-to-UE paging. As another example, paging messages 472 may be transmitted via channels having different frequencies or at different time periods than paging messages for non-UE-to-UE paging, which may be configured by network entity 450 or another component of wireless communications system 400.

After sending paging messages 472 to base stations 434 that serve uEs 430 and 432, network entity 450 may receive UE-to-UE message 474 from UE 115. UE-to-UE message 474 is the message to be sent to the paged uEs. Responsive to receiving UE-to-UE message 474, network entity 450 may forward UE-to-UE message 474 to base stations 434 (e.g., the other network entities) as DL message 476 for transmission to uEs 430 and 432.

As described with reference to FIG. 4, the present disclosure provides techniques for supporting paging for network-based UE-to-UE communication. The techniques described provide a framework for wireless communications system 400 to support proximity-based UE-to-UE communications without requiring uEs to be configured for direct UE-to-UE communications over a sidelink. To illustrate, network entity 450 may be configured to identify a UE-to-UE paging condition that originates at UE 115 (e.g., UE 115 is the source UE) and to identify other network entities (e.g., base stations) to receive a paging message for forwarding to uEs 430 and 432 within their serving area. For example, network entity 450 may determine paging area 464, which corresponds to region 436, and network entity 450 may identify one or more base stations (e.g., other network entities) that serve cells or other coverage areas that intersect with region 436. This process of identifying network entities and uEs within paging area 464 and providing paging messages 472 to such devices enables wireless communications system 400 to simulate and support proximity-based UE-to-UE communications in addition to conventional network-based communications. For example, UE-to-UE paging may be supported not just between UE pairs or to UE groups, as in network-based paging, but also to uEs that execute a particular application (e.g., application 406), or an unidentified number of uEs that are located within a particular geographic region (e.g., within paging range 410 of UE 115). The improved proximity-based UE-to-UE communications described above are provided in a manner that efficiently uses network resources, particularly by communicating paging messages 472 to base stations and associated uEs within a particular identified paging area, and not to all base stations and uEs in the network.

Figure 5A:
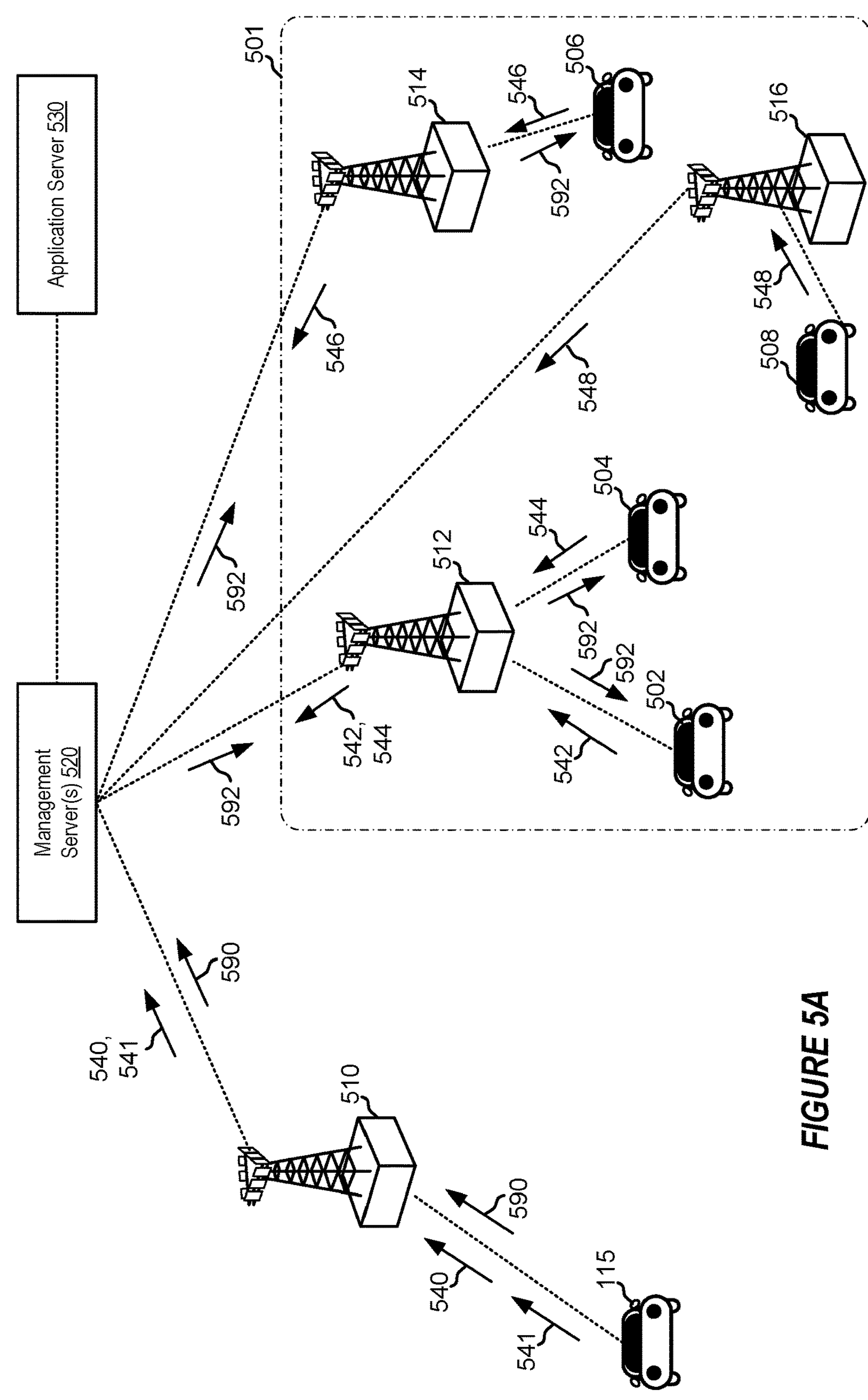
FIG. 5A is a block diagram illustrating an example of wireless communication system that supports paging for network-based vehicle-to-everything (V2X) communication according to one or more aspects.
Figure 5B:
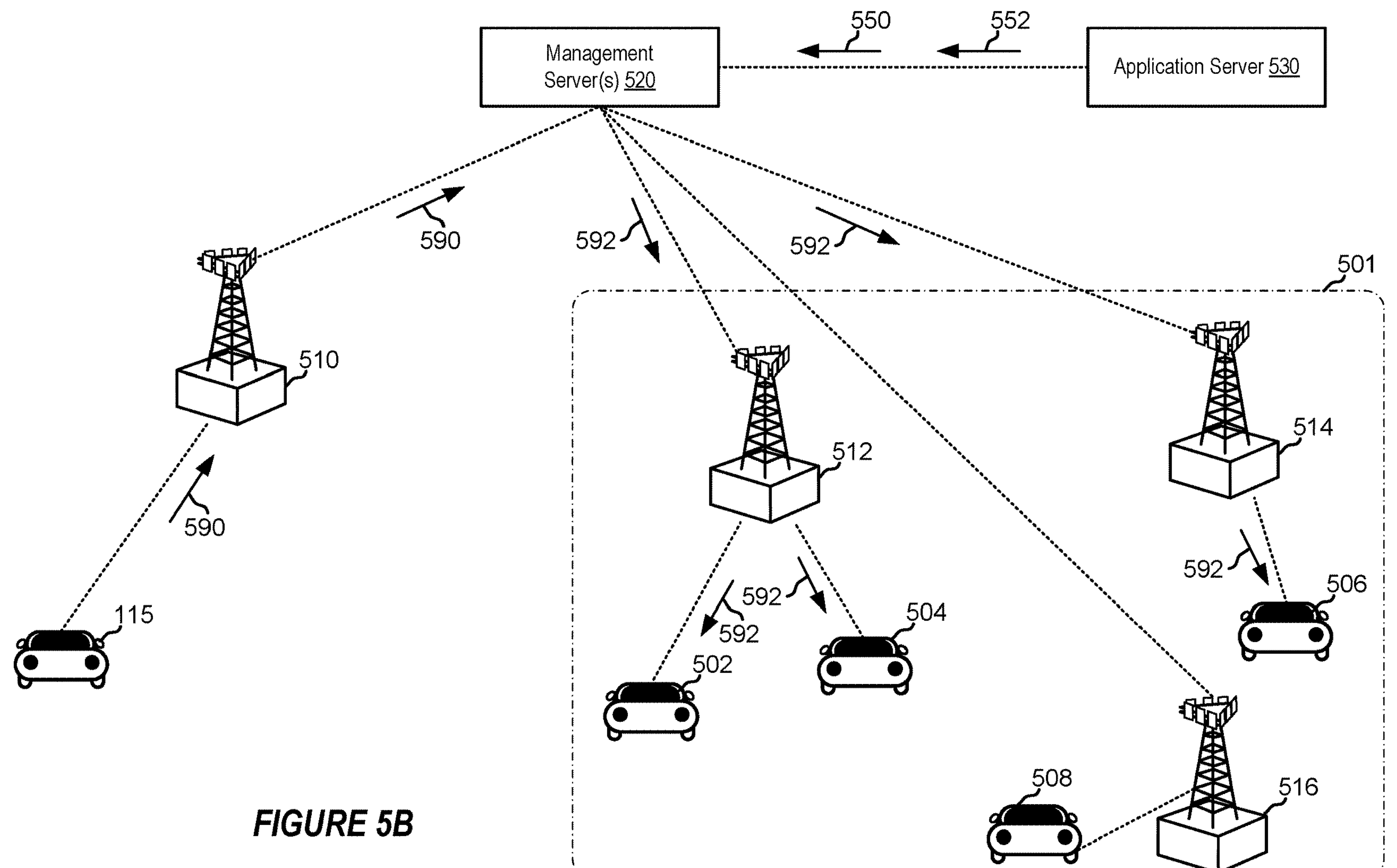
FIG. 5B is a block diagram illustrating another example of wireless communication system that supports paging for network-based V2X communication according to one or more aspects.
Figure 5C:
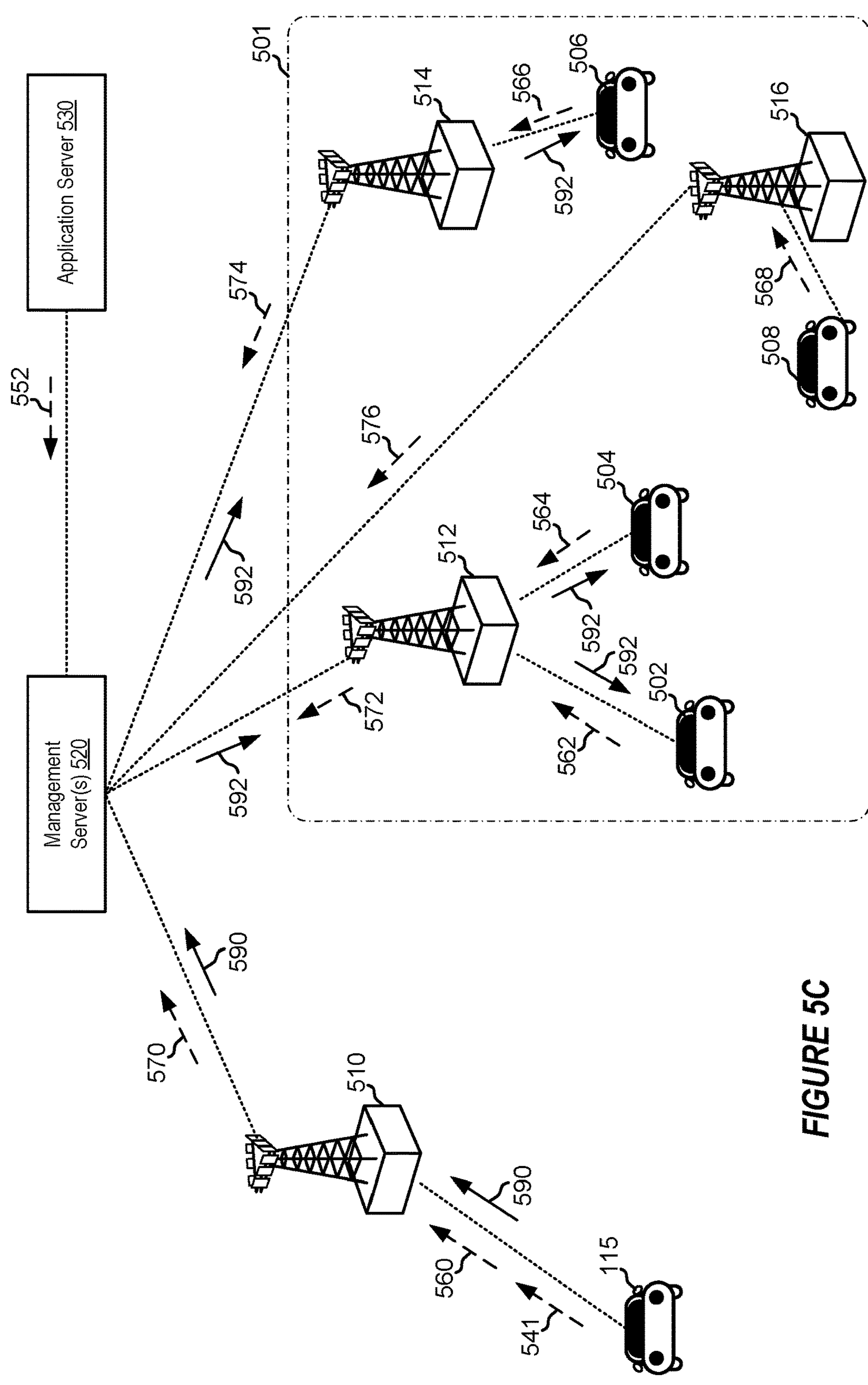
FIG. 5C is a block diagram illustrating another example of wireless communication system that supports paging for network-based V2X communication according to one or more aspects.

FIGS. 5A-C are block diagrams of an example wireless communications system 500 that supports paging for network-based V2X communication according to one or more aspects. Wireless communications system 500 includes uEs 115 and 502-508, base stations 510-516, one or more management servers (referred to herein as "management servers 520"), and an application server 530. Base station 510 may serve a cell in which UE 115 is located, base station 512 may serve a cell in which uEs 502 and 504 are located, base station 514 may serve a cell in which UE 506 is located, and base station 516 may serve a cell in which UE 508 is located. Although five uEs and four base stations are shown in FIGS. 5A-C, in other implementations, wireless communications system 500 may include fewer than five or more than five uEs, fewer than four or more than four base stations, or a combination thereof. Although uEs 115 and 502-508 are illustrated in FIGS. 5A-C as vehicles and examples are described herein in the context of V2X communications, in other implementations, uEs 115 and 502-508 may be other types of uEs such as smart phones carried by pedestrians or other types of uEs, such as IoT devices, that support proximity-based UE-to-UE communications. Additionally or alternatively, although described as base stations 510-516, in other implementations, one or more of base stations 510-516 may be other types of network entities, such as access points, RSUs, servers, communication nodes, or the like.

FIG. 5A illustrates an example where uEs are configured to provide location information and paging range(s) to the network. For example, UE 115 may report location information 540 to the network, UE 502 may report location information 542 to the network, UE 504 may report location information 544 to the network, UE 506 may report location information 546 to the network, and UE 508 may report location information 548 to the network. In some implementations, as shown in FIG. 5A, uEs 115 and 502-508 generate and send location information 540-548 to base stations 510-516, and base stations 510-516 forward location information 540-548 to management servers 520. In some other implementations, uEs 115 and 502-508 generate and send location information 540-548 directly to management servers 520. Location information 540-548 may include position coordinates determined in accordance with GPS or GNSS receivers, location information determined in accordance with positioning operations performed by devices within wireless communications system 500, other position or location information, or a combination thereof. Location information 540-548 may be sent via the control plane, such as via reporting messaging, for example UE 115 may send location information 540 as a RRC message to base station 510, and base station 510 may forward location information 540 to management servers 520 via N2 signaling. As another example, UE 115 may send location information 540 directly to management servers 520 via N1 signaling. Alternatively, location information 540-548 may be sent via the user plane and extracted by management servers 520, as explained with reference to FIG. 4. As an example, location information 540-548 may typically be included in V2X application messages, and management servers 520 may be able to parse the V2X application messages and extract location information 540. In some such implementations, different functionality may be performed by different servers of management servers 520, such that the User Plane Function (UPF) receives the user plane messages and extracts location information 540-548 and sends location information 540-548 to Session Management Function (SMF) via N4 signaling, and the SMF sends location information to Access and Mobility Management Function (AMF) via N11 signaling (all of which may be performed by management servers 520, base stations 510-516, other network entities, or a combination thereof). The above-described AMF, SMF, and UMF are those of the destination uEs, which may be at the same or different server than those of UE 115 (e.g., the source UE).

In addition to sending location information 540, UE 115 may send a paging range 541 to the network. In some implementations, as shown in FIG. 5A, UE 115 sends paging range 541 to base station 510, and base station 510 forwards paging range 541 to management servers 520. In some other implementations, UE 115 sends paging range 541 directly to management servers 520, or management servers 520 are able to determine paging range 541, such as by accessing a UE profile associated with UE 115. Paging range 541 may be included in a configuration message from UE 115 or some other type of signaling.

To initiate UE-to-UE paging for an upcoming UE-to-UE message, UE 115 sends UE-to-UE paging request 590 to the network. Stated another way, a network entity (e.g., management servers 520) may receive UE-to-UE paging request 590 that originates at UE 115 (e.g., a source UE). In the example shown in FIG. 5A, UE 115 sends UE-to-UE paging request 590 to base station 510, and base station 510 forwards UE-to-UE paging request 590 to management servers 520. Although location information 540, paging range 541, and UE-to-UE paging request 590 are shown as separate messages, in some other implementations, location information 540, paging range 541, or both, may be included in UE-to-UE paging request 590, as described above with reference to FIG. 4. UE-to-UE paging request 590 may indicate a destination UE, a destination UE group, a destination application, a destination application group, or a broadcast indicator, as described above with reference to FIG. 4.

After receiving UE-to-UE paging request 590, management servers 520 may determine a paging area for which paging is to be performed. For example, the paging area may be determined as a circular, or other shaped, area that is centered at the location of UE 115 and extends to paging range 541, as described above with reference to FIG. 4. In FIG. 5A, the paging area may cover region 501. To determine which devices are to receive paging, management servers 520 may determine which cells (or other tracking areas) intersect with region 501, and the base stations associated with those cells may be identified as targets for receiving paging messaging. In the example shown in FIG. 5A, cells associated with base stations 512-516 intersect with region 501, and as such base stations 512-516 may be identified as destination network entities by management servers 520. Although determination of the paging area in accordance with cells is described, in other implementations, the paging area may be determined in accordance with other tracking areas, locations of network nodes, or in accordance with other location-related information.

As described above, in some implementations, the paging area may be further refined by identifying an intersection between an initially determined paging area (e.g., in accordance with paging range 541 and the location of UE 115) and a possible area determined in accordance with other factors. For example, in region 501, if the cells associated with base stations 512 and 514 cover the same road that UE 115 is travelling on, and base station 516 does not cover that road but covers other roads that are not connected to the road, the possible area may correspond to the road UE 115 is travelling on (or roads connected to). In such an example, management servers 520 may access map data that includes road layouts to determine that the possible area does not intersect with the cell associated with base station 516, and as such, the intersection of the possible area with the initial paging area results in base station 516 and the associated cell being excluded from the refined paging area. In other examples, other conditions or parameters than the locations of roads may be similarly used to refine an initial paging area determination, such as a direction from UE 115 from which messaging is to be performed, impassable areas located in region 501, or the like. Reducing the number of network entities that send paging messages reduces the network overhead and network congestion associated with supporting network-based UE-to-UE paging for proximity-based communications.

After identifying the base stations, or other network entities, within the paging area, management servers 520 may send paging messages 592 to the identified base stations. To illustrate, management servers 520 may send paging messages 592 to base stations 512 and 514 for transmission to uEs within the associated cells. For example, base station 512 may send paging messages 592 to uEs 502 and 504, and base station 514 may send paging messages 592 to UE 506. Because base station 516 was excluded from the paging area in accordance with its associated cell not intersecting with the possible area (e.g., the road UE 115 is travelling on), management servers 520 do not send paging messages 592 to base station 516 for providing to UE 508. Although described and illustrated as management servers 520 sending paging messages 592 to base stations 512-514, instead, management servers 520 may send control signaling to cause base stations 512-514 to transmit paging messages 592 (i.e., paging messages are not communicated between management servers 520 and any base stations). As explained above, paging messages 592 may be addressed to a single destination UE, a destination UE group, a destination application, a destination application group, or all uEs that receive the message (e.g., paging messages 592 may be broadcast messages), as indicated by UE-to-UE paging request 590. In some implementations, paging messages 592 may include other information related to V2X communications or other types of proximity-based UE-to-UE communications, such as a priority level, a quality of service identifier ("5QI"), other parameters, or a combination thereof. After receiving paging messages 592, uEs 502-506 may process paging messages 592 to determine whether to monitor for a subsequent message that will originate at UE 115.

Format and/or transmission of paging messages 592 may be different than transmission of typical network-based (e.g., Uu) paging messages. As an example, DCI scheduling a PDSCH to carry paging messages 592 may be addressed by a dedicated P-RNTI that is different from a fixed P-RNTI used to address Uu paging, and the dedicated P-RNTI may be configured or broadcasted by the network (e.g., by management servers 520). As another example, the paging occasions for proximity-based UE-to-UE paging, such as V2X paging, may be different than Uu paging, e.g., a determination of paging occasions may be in accordance with a V2X related ID (e.g., Layer-2 destination ID, V2X application ID, etc.) rather than a target UE ID as in Uu paging. As described above, paging messages 592 may be addressed in multiple different manners. In one example, paging messages 592 may be source-destination specific (i.e., each paging message is for a pair of Layer-2 source ID and Layer 2 destination ID). In another example, paging messages 592 may be destination or application specific (i.e., each paging message is for a single Layer 2 destination ID or a single V2X application ID). In yet another example, paging messages 492 can target more than one source-destination pair, more than one destination, or more than one V2X application. The configuration for such V2X or other proximity-based UE-to-UE paging may be provided by management servers 520 (e.g., the network), which may include setting time and frequency resource locations for paging transmissions (e.g., paging frames), RNTI addressing, DCI scheduling paging messages, etc. In some implementations, base stations 512-514 may send paging messages 592 via PCCHs. In some implementations, base stations 512-514 may send paging messages 592 in DCI via PDCcHs. UEs 502-506 may determine whether paging messages 592 are relevant in accordance with information carried in paging messages 592, such as Layer-2 source IDs, Layer-2 destination IDs, application IDs, or a combination thereof. If a UE determines that paging message 592 are relevant, the UE may proceed with a next communication procedure, such as transitioning from a sleep mode or low-energy mode (e.g., a Connection Management Idle (CM-idle) mode) to an active operating mode (e.g., a CM-connected mode).

FIG. 5B illustrates an example in which application server 530 is configured to provide information to the network to enable proximity-based UE-to-UE paging supported by the network. Application server 530 is associated with an application that supports proximity-based UE-to-UE paging and messaging, such as a V2X application. For example, application server 530 may be associated with application 406 of FIG. 4. To illustrate the operations of application server 530 in providing information, instead of UEs 115 and 502-508 reporting location information to the network (e.g., to management servers 520), application server 530 may provide location information 550 associated with one or more of UEs 115 and 502-508. In some implementations, UEs 115 and 502-508 may report location information to application server 530, such as via higher layer signaling that is not decodable by management servers 520, and application server 530 maintains a location database and updates management servers 520 via transmission of location information 550. Alternatively, location information may be included in user plane data that passes from UEs 115 and 502-508 to application server 530, and application server 530 may extract the various location data and send it to management servers 520 as location information 550.

In addition to, or in the alternative to, sending location information 550, application server 530 may send paging range 552 to management servers 520 to enable network-based UE-to-UE paging by UE 115. In some implementations, paging range 552 may be sent as a configuration message or part of a configuration setup process between application server 530 and management servers 520. In some other implementations, application server 530 may receive a UE-to-UE paging request that originates at UE 115, and application server 530 may send paging range 552 after selecting an appropriate paging range in accordance with the type of communication for which paging is being requested. For example, UE 115 may send UE-to-UE paging request 590 to the network, similar to as described with reference to FIG. 5A, and UE-to-UE paging request 590 may be forwarded to both management servers 520 and application server 530. Application server 530 may be configured to analyze information in UE-to-UE paging request 590 to determine and provide paging range 552 to management servers 520. After management servers 520 receive and process UE-to-UE paging request 590, or otherwise identify a UE-to-UE paging request, management servers 520 may determine a paging area in accordance with location information 550 and paging range 552, and management servers 520 may initiate the transmission of paging messages 592 by base stations 512-514 (e.g., network entities identified as being within the paging area), as described above with reference to FIG. 5A. In some implementations, the possible area (e.g., the road being travelled by UE 115 and connected roads) may be determined and identified by application server 530, and provided to management servers 520 for refining the paging area as described above with reference to FIG. 5A.

FIG. 5C illustrates an example in which the network determines location information in accordance with messaging from UEs or associated base stations. In some implementations, instead of sending location information 540-548 to the network, UEs 115 and 502-508 may send other messaging that indicates an associated base station, and management servers 520 may determine locations of UEs 115 and 502-508 in accordance with locations of the associated base stations. For example, UEs 115 and 502-508 may send cell attachment messages 560-568 that indicate cell IDs of cells that UEs 115 and 502-508 are attached to.

In particular, UE 115 may send cell attachment message 560 after completing an attachment process with base station 510, UEs 502 and 504 may send cell attachment messages 562 and 564, respectively, after completing a respective attachment process with base station 512, UE 506 may send cell attachment message 566 after completing an attachment process with base station 514, and UE 508 may send cell attachment message 568 after completing an attachment process with base station 516. Management servers 520 may determine serving base stations associated with the cells in which UEs 115 and 502-508 are located in accordance with cell attachment messages 560-568, which may be used to estimate the location of UEs 115 and 502-508. For example, UE 115 may send cell attachment message 560 that includes a cell ID associated with base station 510, and management servers 520 may estimate a location of UE 115 in accordance with a known location of base station 510 and the associated cell. As another example, UEs 502 and 504 may send cell attachment messages 562 and 564, respectively, that each include the cell ID associated with base station 512, and management servers 520 may estimate locations of UEs 502 and 504 in accordance with a known location of base station 512 and the associated cell.

In some other implementations, management servers 520 may determine the location of UEs 115 and 502-508 in accordance with messages that originate at base stations 510-518. To illustrate, base station 510 may send association message 570 in accordance with successfully completing an association process with UE 115, and association message 570 may indicate a cell ID or other ID associated with base station 510 and a UE ID associated with UE 115, thereby enabling management servers 520 to determine that UE 115 is located within the cell or other tracking area associated with base station 510. Similarly, base station 512 may send association message 572 in accordance with successfully completing association processes with UEs 502 and 504, base station 514 may send association message 574 in accordance with successfully completing an association process with UE 506, and base station 516 may send association message 576 in accordance with successfully completing an association process with UE 508. Management servers 520 may estimate the locations of UEs 115 and 502-508 in accordance with association messages 570-576, which may be used to identify which base stations are to send paging messages to their associated UEs.

In some implementations, the determination of the paging area may be in accordance with paging range 541 received from UE 115, as described above with reference to FIG. 5A. In some other implementations, the determination may be in accordance with paging range 552 received from application server 530, as described above with reference to FIG. 5B. Additionally or alternatively, management servers 520 may further refine the paging area in accordance with information derived from map data or received from application server 530, as described above. Although the example shown in FIG. 5C illustrates UE 115 sending UE-to-UE paging request 590, in some other implementations, management servers 520 may identify a UE-to-UE paging condition in accordance with a more passive condition, such as receipt of location information associated with UE 115 and either paging range 541 or paging range 552, as described above with reference to FIG. 4.

Figures 6, 7:
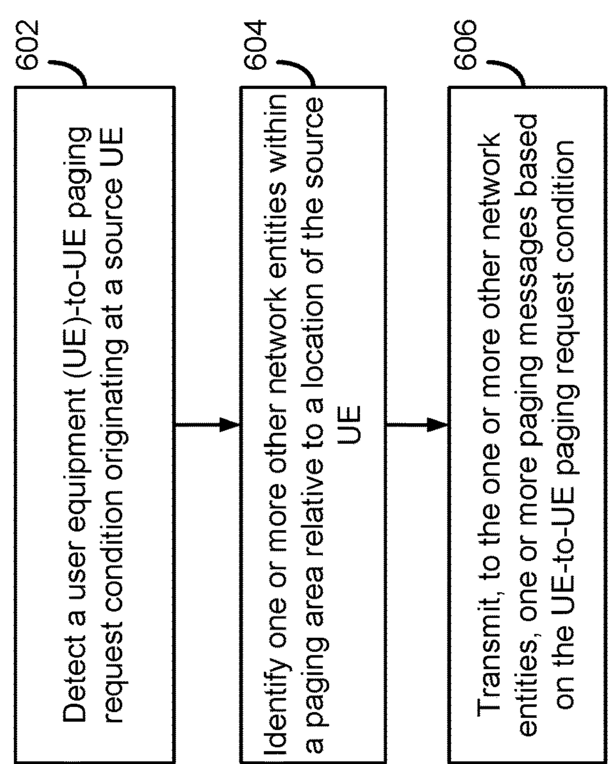
FIG. 6 is a flow diagram illustrating an example process that supports paging for network-based UE-to-UE communication according to one or more aspects.
FIG. 7 is a block diagram of an example network entity that supports paging for network-based UE-to-UE communication according to one or more aspects.

FIG. 6 is a flow diagram illustrating an example process 600 that supports paging for network-based UE-to-UE communication according to one or more aspects. Operations of process 600 may be performed by a network entity, such as base station 105 described above with reference to FIGS. 1-3, network entity 450 described above with reference to FIG. 4, management servers 520 described above with reference to FIGS. 5A-C, base stations 510, 512, 514, and 516 described above with reference to FIGS. 5A-C, or a network entity as described above with reference to FIG. 7. For example, example operations of process 600 may enable network entity 450 to support paging for network-based UE-to-UE communication.

At block 602, the network entity identifies a UE-to-UE paging request condition originating at a source UE. For example, the UE-to-UE paging request condition may include or correspond to UE-to-UE paging request 470 of FIG. 4 or other identified conditions described above with reference to FIGS. 4 and 5A-C, and the source UE may include or correspond to UE 115 of FIG. 4. In some implementations, the UE-to-UE paging request condition is associated with an application executed by the source UE, such as in particular, a V2X application that generates a V2X paging condition.

At block 604, the network entity identifies one or more other network entities within a paging area relative to a location of the source UE. For example, the paging area may include or correspond to paging area 464 of FIG. 4, and the one or more other network entities may include or correspond to network entities that serve UEs 430 and 432 of FIG. 4.

At block 606, the network entity transmits, to the one or more other network entities, one or more paging messages in accordance with the UE-to-UE paging request condition. For example, the one or more paging messages may include or correspond to paging messages 472 of FIG. 4.

In some implementations, identifying the UE-to-UE paging request condition includes receiving a UE-to-UE paging request originating at the source UE. For example, the UE-to-UE paging request may include or correspond to the UE-to-UE paging request 470 of FIG. 4. In some such implementations, the UE-to-UE paging request indicates the location of the source UE, a paging range associated with the paging area, or both. Additionally or alternatively, the UE-to-UE paging request may indicate a destination UE, a destination UE group, a destination application, or a broadcast indicator.

In some implementations, identifying the UE-to-UE paging request includes receiving location information associated with the source UE, a paging range associated with the paging area, or both. For example, the location information may include or correspond to the location information 408 of FIG. 4, and the paging range may include or correspond to the paging range 410 of FIG. 4. In some other implementations, identifying the UE-to-UE paging request includes receiving a paging request originating at the source UE and accessing a profile associated with the source UE to determine whether the source UE is associated with UE-to-UE paging. For example, the profile may include or correspond to UE profiles 469 of FIG. 4.

In some implementations, process 600 also includes receiving a reporting message that includes location information associated with the source UE and identifying the location of the source UE in accordance with the location information. For example, the reporting message may include or correspond to location information 540 of FIG. 5A. In some such implementations, the reporting message includes or corresponds to a RRC message received from a serving network entity associated with the source UE. Alternatively, the reporting message may include or correspond to a RRC message received from the source UE. Additionally or alternatively, the UE-to-UE paging request condition may be associated with an application executed by the source UE, and the reporting message may include or correspond to a message received from an application server associated with the application. For example, the reporting message may include or correspond to location information 550 of FIG. 5B.

In some implementations, process 600 also includes receiving one or more user data packets originating at the source UE, extracting location information associated with the source UE from the one or more user data packets, and identifying the location of the source UE in accordance with the location information. For example, network entity of 450 may receive one or more user data packets originating at UE 115 and determine source UE location 462 in accordance with information extracted from the user data packets (e.g., by network entity 450 or by application server 530 of FIGS. 5A-C).

In some implementations, identifying the UE-to-UE paging request condition includes receiving a UE-to-UE paging request from a different network entity. For example, the UE-to-UE paging request may include or correspond to the UE-to-UE paging request 590 of FIG. 5A. In such implementations, process 600 may further include identifying the location of the source UE in accordance with a location of the different network entity. For example, the location of the different network entity may include or correspond to the location of base station 510 of FIG. 5A.

In some implementations, process 600 also includes receiving a cell attachment message associated with the source UE. The cell attachment message indicates a cell ID of a cell that the source UE is attached to. For example, the cell attachment message may include or correspond to cell attachment message 560 of FIG. 5C. In such implementations, process 600 further includes identifying a serving network entity associated with the cell identifying the location of the source UE in accordance with a location of the serving network entity. In some other implementations, process 600 also includes receiving an association message associated with the source UE. The association message indicates a serving network entity to which the source UE is attached. For example, the association message may include or correspond to association message 570 of FIG. 5C. In such implementations, process 600 further includes identifying the location of the source UE in accordance with a location of the serving network entity.

In some implementations, process 600 also includes receiving one or more user data packets that indicate a UE ID of the source UE and a network entity ID of a serving network entity of the source UE and identifying the location of the source UE in accordance with a location of the serving network entity. For example, network entity of 450 may receive one or more user data packets originating at UE 115 and determine source UE location 462 in accordance with a network entity ID extracted from the user data packets (e.g., by network entity 450 or by application server 530 of FIGS. 5A-C).

In some implementations, process 600 also includes receiving a configuration message originating at the source UE. The configuration message indicates a paging range associated with the paging area. For example, the configuration message may include or correspond to configuration message 478 of FIG. 4. In such implementations, process 600 further includes identifying the paging area in accordance with the paging range and the location of the source UE. For example, the paging range may include or correspond to paging range 410 carried by configuration message 478. In some other implementations, process 600 also includes receiving a configuration message from an application server associated with an application at the source UE. The configuration message indicates a paging range associated with the paging area. For example, the paging range includes or corresponds to paging range 552 of FIG. 5B. In such implementations, process 600 further includes identifying the paging area in accordance with the paging range and the location of the source UE.

In some implementations, process 600 also includes identifying one or more tracking areas that intersect the paging area. The one or more other network entities are identified in accordance with being located in the one or more tracking areas. For example, identified network entities 466 of FIG. 4 may be identified in accordance with associated tracking areas intersecting paging area 464 (e.g., geographic region 436).

In some implementations, process 600 also includes identifying a possible location area in accordance with map data, UE information associated with the source UE, application information associated with an application executed at the source UE, or a combination thereof. The one or more other network entities are located in an intersection of the paging area and the possible location area. For example, the possible location area may be identified in accordance with map data 468 of FIG. 4. In some other implementations, process 600 includes receiving a message from an application server associated with an application executed at the source UE. The message indicates a possible area location, and the one or more other network entities are located in an intersection of the paging area and the possible location area. For example, the message may be received from application server 530 of FIGS. 5A-C.

In some implementations, the one or more paging messages include a source UE ID, a source application ID, or both. Additionally or alternatively, the one or more paging messages may include a destination UE ID, a destination group ID, or a destination application ID. Alternatively, the one or more paging messages may be designated as broadcast messages to the one or more other network entities. Additionally or alternatively, the one or more paging messages may include a first P-RNTI that is different than a second P-RNTI associated with non-UE-to-UE paging. Additionally or alternatively, the one or more paging messages may be designated to be transmitted by the one or more other network entities via PCCHs or PDCCHs.

FIG. 7 is a block diagram of an example network entity 700 that supports paging for network-based UE-to-UE communication according to one or more aspects. Network entity 700 may be configured to perform operations, including the blocks of process 600 described with reference to FIG. 6. In some implementations, base station 800 includes the structure, hardware, and components shown and described with reference to base station 105 of FIGS. 1-3, network entity 450 of FIG. 4, management servers 520 of FIGS. 5A-C, and/or base stations 510, 512, 514, and 516 of FIGS. 5A-C. For example, network entity 700 may include controller 240, which operates to execute logic or computer instructions stored in memory 242, as well as controlling the components of network entity 700 that provide the features and functionality of network entity 700. Network entity 700, under control of controller 240, transmits and receives signals via wireless radios 701_a-t_ and antennas 234_a-t_. Wireless radios 701_a-t_ include various components and hardware, as illustrated in FIG. 2 for base station 105, including modulator and demodulators 232_a-t_, transmit processor 220, TX MIMO processor 230, MIMO detector 236, and receive processor 238.

As shown, the memory 242 may include UE-to-UE paging information 702, paging area information 703, and communication logic 704. UE-to-UE paging information 702 may include or correspond to information indicating a location of a source UE of a UE-to-UE paging request condition, a paging range associated with UE-to-UE paging, source parameters for a UE-to-UE paging message, destination parameters for a UE-to-UE paging message, or a combination thereof. Paging area information 703 may indicate a paging area determined in accordance with the location of the source UE and the paging range, and may include or correspond to paging area 464 of FIG. 4. Communication logic 704 may be configured to enable communication between network entity 700 and one or more other devices. network entity 700 may receive signals from or transmit signals to one or more UEs, such as UE 115 of FIGS. 1-4 and 5A-C, UEs 430 and 432 of FIG. 4, UEs 502-508 of FIGS. 5A-C.

It is noted that one or more blocks (or operations) described with reference to FIG. 6 may be combined with one or more blocks (or operations) described with reference to another of the figures. As another example, one or more blocks associated with FIG. 6 may be combined with one or more blocks (or operations) associated with FIGS. 1-4 and 5A-C. Additionally, or alternatively, one or more operations described above with reference to FIGS. 1-4 and 5A-C may be combined with one or more operations described with reference to FIG. 7.

In one or more aspects, techniques for supporting paging for network-based UE-to-UE communication may include additional aspects, such as any single aspect or any combination of aspects described below or in connection with one or more other processes or devices described elsewhere herein. In some aspects, an apparatus for wireless communication at a network entity may support paging for network-based UE-to-UE communication. In some implementations, the apparatus includes or is integrated in a wireless device, such as a base station, a server, or other network entity. In some implementations, the apparatus may include a processing system that includes one or more processors and one or more memories coupled with the one or more processors. The processing system may be configured to cause the network entity to perform operations described herein with respect to the apparatus. In some other implementations, the apparatus may include a non-transitory computer-readable medium storing instructions that, when executed by a processor, cause the processor to perform operations described herein with reference to the apparatus. In some implementations, the apparatus may include one or more means configured to perform operations described herein. In some implementations, a method of wireless communication at a network entity may include one or more operations described herein with reference to the apparatus.

Implementations examples are described in the following numbered clauses.

Clause 1: An apparatus for wireless communication at a network entity, the apparatus including a processing system that includes one or more processors and one or more memories coupled with the one or more processors. The processing system is configured to cause the network entity to identify a UE-to-UE paging request condition originating at a source UE. The processing system is also configured to cause the network entity to identify one or more other network entities within a paging area relative to a location of the source UE. The processing system is further configured to cause the entity to transmit, to the one or more other network entities, one or more paging messages in accordance with the UE-to-UE paging request condition.

Clause 2: The apparatus of clause 1, wherein the processing system is configured to cause the network entity, to identify the UE-to-UE paging request condition, to receive a UE-to-UE paging request originating at the source UE.

Clause 3: The apparatus of clause 2, wherein the UE-to-UE paging request indicates the location of the source UE, a paging range associated with the paging area, or both.

Clause 4: The apparatus of clause 2, wherein the UE-to-UE paging request indicates a destination UE, a destination UE group, a destination application, or a broadcast indicator.

Clause 5: The apparatus of clause 1, wherein, to identify the UE-to-UE paging request condition, the processing system is configured to cause the network entity to receive location information associated with the source UE, a paging range associated with the paging area, or both.

Clause 6: The apparatus of clause 1, wherein, to identify the UE-to-UE paging request condition, the processing system is configured to cause the network entity to receive a paging request originating at the source UE and access a profile associated with the source UE to determine whether the source UE is associated with UE-to-UE paging.

Clause 7: The apparatus of clause 1, wherein the UE-to-UE paging request condition includes a V2X paging condition.

Clause 8: A method of wireless communication performed at a network entity, the method including: identifying a UE-to-UE paging request condition originating at a source UE, identifying one or more other network entities within a paging area relative to a location of the source UE, and transmitting, to the one or more other network entities, one or more paging messages in accordance with the UE-to-UE paging request condition.

Clause 9: The method of clause 8, further including: receiving a reporting message that includes location information associated with the source UE, and identifying the location of the source UE in accordance with the location information.

Clause 10: The method of clause 9, wherein the reporting message includes a RRC message received from a serving network entity associated with the source UE.

Clause 11: The method of clause 9, wherein the reporting message includes a RRC message received from the source UE.

Clause 12: The method of clause 9, wherein the UE-to-UE paging request condition is associated with an application executed by the source UE, and wherein the reporting message includes a message received from an application server associated with the application.

Clause 13: The method of clause 8, further including: receiving one or more user data packets originating at the source UE, extracting location information associated with the source UE from the one or more user data packets, and identifying the location of the source UE in accordance with the location information.

Clause 14: The method of clause 8, wherein identifying the UE-to-UE paging request condition includes receiving a UE-to-UE paging request from a different network entity, and wherein the method further includes identifying the location of the source UE in accordance with a location of the different network entity.

Clause 15: The method of clause 8, further including receiving a cell attachment message associated with the source UE, the cell attachment message indicating a cell ID of a cell that the source UE is attached to, identifying a serving network entity associated with the cell, and identifying the location of the source UE in accordance with a location of the serving network entity.

Clause 16: The method of clause 8, further including receiving an association message associated with the source UE, the association message indicating a serving network entity to which the source UE is attached, and identifying the location of the source UE in accordance with a location of the serving network entity.

Clause 17: The method of clause 8, further including receiving one or more user data packets that indicate a UE ID of the source UE and a network entity ID of a serving network entity of the source UE, and identifying the location of the source UE in accordance with a location of the serving network entity.

Clause 18: The method of clause 8, further including receiving a configuration message originating at the source UE, the configuration message indicating a paging range associated with the paging area, and identifying the paging area in accordance with the paging range and the location of the source UE.

Clause 19: The method of clause 8, further including receiving a configuration message from an application server associated with an application at the source UE, the configuration message indicating a paging range associated with the paging area, and identifying the paging area in accordance with the paging range and the location of the source UE.

Clause 20: An apparatus for wireless communication at a network entity including means for identifying a UE-to-UE paging request condition originating at a source UE, means for identifying one or more other network entities within a paging area relative to a location of the source UE, and means for transmitting, to the one or more other network entities, one or more paging messages in accordance with the UE-to-UE paging request condition.

Clause 21: The apparatus of clause 20, wherein the one or more paging messages include a source UE ID, a source application ID, or both.

Clause 22: The apparatus of clause 21, wherein the one or more paging messages include a destination UE ID, a destination group ID, or a destination application ID.

Clause 23: The apparatus of clause 21, wherein the one or more paging messages are designated as broadcast messages to the one or more other network entities.

Clause 24: The apparatus of clause 20, wherein the one or more paging messages include a first P-RNTI that is different than a second P-RNTI associated with non-UE-to-UE paging.

Clause 25: The apparatus of clause 20, wherein the one or more paging messages are designated to be transmitted by the one or more other network entities via PCCHs.

Clause 26: The apparatus of clause 20, wherein the one or more paging messages are designated to be transmitted by the one or more other network entities as DCI via PDCCHs.

Clause 27: A non-transitory computer-readable medium storing instructions that, when executed by a processor, cause the processor to perform operations for wireless communication at a network entity. The operations include identifying a UE-to-UE paging request condition originating at a source UE. The operations also include identifying one or more other network entities within a paging area relative to a location of the source UE. The operations further include transmitting, to the one or more other network entities, one or more paging messages in accordance with the UE-to-UE paging request condition.

Clause 28: The non-transitory, computer-readable medium of clause 27, wherein the operations further include identifying one or more tracking areas that intersect the paging area. The one or more other network entities are identified in accordance with being located in the one or more tracking areas.

Clause 29: The non-transitory, computer-readable medium of clause 27, wherein the operations further include identifying a possible location area in accordance with map data, UE information associated with the source UE, application information associated with an application executed at the source UE, or a combination thereof. The one or more other network entities are located in an intersection of the paging area and the possible location area.

Clause 30: The non-transitory, computer-readable medium of clause 27, wherein the operations further include receiving a message from an application server associated with an application executed at the source UE. The message indicates a possible area location. The one or more other network entities are located in an intersection of the paging area and the possible location area.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms “upper” and “lower” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the for of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term “or,” when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, “or” as used in a list of items prefaced by “at least one of” indicates a disjunctive list such that, for example, a list of “at least one of A, B, or C” means A or B or C or AB or AC or BC or ABC (that is A and B and C) or any of these in any combination thereof. The term “substantially” is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication at a network entity comprising:
- a processing system that includes one or more processors and one or more memories coupled with the one or more processors, the processing system configured to cause the network entity to:
  - identify, by the network entity, a user equipment (UE)-to-UE paging request condition originating at a source UE, wherein the network entity includes a base station or a management server;
  - identify, by the network entity, one or more other network entities within a paging area relative to a location of the source UE; and
  - transmit, by the network entity to the one or more other network entities, one or more paging messages in accordance with the UE-to-UE paging request condition.

2. The apparatus of claim 1, wherein the processing system is configured to cause the network entity to receive a UE-to-UE paging request originating at the source UE based on the UE-to-UE paging request condition.

3. The apparatus of claim 2, wherein the UE-to-UE paging request indicates the location of the source UE, a paging range associated with the paging area, or both.

4. The apparatus of claim 2, wherein the UE-to-UE paging request indicates a destination UE, a destination UE group, a destination application, or a broadcast indicator.

5. The apparatus of claim 1, wherein, to identify the UE-to-UE paging request condition, the processing system is configured to cause the network entity to receive location information associated with the source UE, a paging range associated with the paging area, or both.

6. The apparatus of claim 1, wherein, to identify the UE-to-UE paging request condition, the processing system is configured to cause the network entity to:
- receive a paging request originating at the source UE; and
- access a profile associated with the source UE to determine whether the source UE is associated with UE-to-UE paging.

7. The apparatus of claim 1, wherein the UE-to-UE paging request condition comprises a vehicle-to-everything (V2X) paging condition.

8. A method of wireless communication performed at a network entity, the method comprising:
- identifying, by the network entity, a user equipment (UE)-to-UE paging request condition originating at a source UE, wherein the network entity includes a base station or a management server;
- identifying, by the network entity, one or more other network entities within a paging area relative to a location of the source UE; and
- transmitting, by the network entity to the one or more other network entities, one or more paging messages in accordance with the UE-to-UE paging request condition.

9. The method of claim 8, further comprising:
- receiving a reporting message that includes location information associated with the source UE, wherein the one or more networking entities are identified in accordance with the location of the source UE in accordance with the location information received in the reporting message.

10. The method of claim 9, wherein the reporting message comprises a radio resource control (RRC) message received from a serving network entity associated with the source UE.

11. The method of claim 9, wherein the reporting message comprises a radio resource control (RRC) message received from the source UE.

12. The method of claim 9, wherein the UE-to-UE paging request condition is associated with an application executed by the source UE, and wherein the reporting message comprises a message received from an application server associated with the application.

13. The method of claim 8, further comprising:
- receiving one or more user data packets originating at the source UE;
- extracting location information associated with the source UE from the one or more user data packets; and
- identifying the location of the source UE in accordance with the location information.

14. The method of claim 8, wherein identifying the UE-to-UE paging request condition comprises receiving a UE-to-UE paging request from a different network entity, and wherein the method further comprises:
- identifying the location of the source UE in accordance with a location of the different network entity.

15. The method of claim 8, further comprising:
- receiving a cell attachment message associated with the source UE, the cell attachment message indicating a cell identifier (ID) of a cell that the source UE is attached to, wherein a serving network entity associated with the cell is identified in accordance with the cell ID and the location of the source UE is identified in accordance with a location of the serving network entity.

16. The method of claim 8, further comprising:
- receiving an association message associated with the source UE, the association message indicating a serving network entity to which the source UE is attached, wherein the location of the source UE is identified in accordance with a location of the serving network entity.

17. The method of claim 8, further comprising:
- receiving one or more user data packets that indicate a UE identifier (ID) of the source UE and a network entity ID of a serving network entity of the source UE, wherein the location of the source UE is identified in accordance with a location of the serving network entity.

18. The method of claim 8, further comprising:
- receiving a configuration message originating at the source UE, the configuration message indicating a paging range associated with the paging area, wherein the paging area is identified in accordance with the paging range and the location of the source UE.

19. The method of claim 8, further comprising:

receiving a configuration message from an application server associated with an application at the source UE, the configuration message indicating a paging range associated with the paging area, wherein the paging area is identified in accordance with the paging range and the location of the source UE.

20. An apparatus for wireless communication at a network entity comprising:

means for identifying a user equipment (UE)-to-UE paging request condition originating at a source UE, wherein the network entity includes a base station or a management server;

means for identifying one or more other network entities within a paging area relative to a location of the source UE; and means for transmitting, to the one or more other network entities, one or more paging messages in accordance with the UE-to-UE paging request condition.

21. The apparatus of claim 20, wherein the one or more paging messages include a source UE identifier (ID), a source application ID, or both.

22. The apparatus of claim 21, wherein the one or more paging messages include a destination UE ID, a destination group ID, or a destination application ID.

23. The apparatus of claim 21, wherein the one or more paging messages are designated as broadcast messages to the one or more other network entities.

24. The apparatus of claim 20, wherein the one or more paging messages include a first paging-radio network temporary identifier (P-RNTI) that is different than a second P-RNTI associated with non-UE-to-UE paging.

25. The apparatus of claim 20, wherein the one or more paging messages are designated to be transmitted by the one or more other network entities via paging control channels (PCCHs).

26. The apparatus of claim 20, wherein the network entity is an Access and Mobility Management Function (AMF), wherein the one or more other network entities include one or more base stations, and wherein the one or more paging messages are designated to be transmitted by the one or more other network entities as downlink control information (DCI) via physical downlink control channels (PDCCHs).

27. A non-transitory computer-readable medium storing instructions that, when executed by a processor, cause the processor to perform operations for wireless communication at a network entity, the operations comprising:

identifying, by the network entity, a user equipment (UE)-to-UE paging request condition originating at a source UE, wherein the network entity includes a base station or a management server;

identifying, by the network entity, one or more other network entities within a paging area relative to a location of the source UE; and transmitting, by the network entity to the one or more other network entities, one or more paging messages in accordance with the UE-to-UE paging request condition.

28. The non-transitory, computer-readable medium of claim 27, wherein the operations further comprise:

identifying one or more tracking areas that intersect the paging area, wherein the one or more other network entities are identified in accordance with being located in the one or more tracking areas.

29. The non-transitory, computer-readable medium of claim 27, wherein the operations further comprise:

identifying a possible location area in accordance with map data, UE information associated with the source UE, application information associated with an application executed at the source UE, or a combination thereof, wherein the one or more other network entities are located in an intersection of the paging area and the possible location area.

30. The non-transitory, computer-readable medium of claim 27, wherein the operations further comprise:

receiving a message from an application server associated with an application executed at the source UE, the message indicating a possible area location, wherein the one or more other network entities are located in an intersection of the paging area and the possible location area.

* * * * *